(12) United States Patent
Menzel

(10) Patent No.: US 10,952,042 B2
(45) Date of Patent: Mar. 16, 2021

(54) METHOD AND APPARATUS FOR PROCESSING VEHICLE-TO-X COMMUNICATIONS

(71) Applicant: Continental Teves AG & Co. OHG, Frankfurt am Main (DE)

(72) Inventor: Marc Menzel, Weimar (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 144 days.

(21) Appl. No.: 15/304,182

(22) PCT Filed: Apr. 9, 2015

(86) PCT No.: PCT/EP2015/057753
§ 371 (c)(1),
(2) Date: Oct. 14, 2016

(87) PCT Pub. No.: WO2015/158606
PCT Pub. Date: Oct. 22, 2015

(65) Prior Publication Data
US 2019/0313220 A1    Oct. 10, 2019

(30) Foreign Application Priority Data

Apr. 14, 2014  (DE) .................... 10 2014 207 093.7
Dec. 18, 2014  (DE) .................... 10 2014 018 672.5

(51) Int. Cl.
*H04W 4/40*      (2018.01)
*H04W 4/12*      (2009.01)
(Continued)

(52) U.S. Cl.
CPC ............ *H04W 4/40* (2018.02); *G08G 1/0112* (2013.01); *H04L 69/18* (2013.01); *H04W 4/029* (2018.02); *H04W 4/12* (2013.01); *H04W 84/18* (2013.01)

(58) Field of Classification Search
None
See application file for complete search history.

(56) References Cited

U.S. PATENT DOCUMENTS 6,256,778 B1    7/2001  Oliver
8,705,527 B1 *  4/2014  Addepalli ............... H04Q 9/00
                                                              370/389
(Continued)

FOREIGN PATENT DOCUMENTS

DE    102010029485 A1    12/2010
DE    102014207093 A1    10/2015
(Continued)

OTHER PUBLICATIONS

International Search Report and Written Opinion dated Jul. 13, 2015 from corresponding International Patent Application No. PCT/EP2015/057753.
(Continued)

*Primary Examiner* — Peter D Nolan
*Assistant Examiner* — Demetra R Smith-Stewart

(57) ABSTRACT

A method of processing a vehicle-to-X message in a plurality of stages in a vehicle-to-X communications module, processing being performed in at least some of the stages in dependence upon an area status such that the outlay for providing vehicle-to-X communication in different geographical areas can be considerably reduced. The invention also relates to a vehicle-to-X communications module and a storage medium for performing the method.

24 Claims, 2 Drawing Sheets

(51) Int. Cl.
*H04W 4/029* (2018.01)
*G08G 1/01* (2006.01)
*H04L 29/06* (2006.01)
*H04W 84/18* (2009.01)

(56) References Cited

U.S. PATENT DOCUMENTS

| | | | |
|---|---|---|---|
| 8,838,383 B2* | 9/2014 | Stahlin | H04L 67/12 |
| | | | 701/484 |
| 9,083,581 B1* | 7/2015 | Addepalli | G06F 9/542 |
| 9,813,406 B2* | 11/2017 | Levin | H04L 63/0823 |
| 2002/0021796 A1 | 2/2002 | Schessel | |
| 2006/0109815 A1 | 5/2006 | Ozer | |
| 2010/0148940 A1* | 6/2010 | Gelvin | G06F 15/173 |
| | | | 340/286.02 |
| 2011/0034183 A1 | 2/2011 | Haag et al. | |
| 2011/0151845 A1 | 6/2011 | Staykoff | |
| 2012/0239294 A1* | 9/2012 | Stahlin | H04L 67/12 |
| | | | 701/484 |
| 2013/0099941 A1* | 4/2013 | Jana | H04W 4/023 |
| | | | 340/905 |
| 2013/0250824 A1 | 6/2013 | Sakata | |
| 2013/0282263 A1 | 10/2013 | Tee | |
| 2014/0022128 A1* | 1/2014 | Smith | G01S 5/0273 |
| | | | 342/465 |

FOREIGN PATENT DOCUMENTS

| | | |
|---|---|---|
| DE | 102014018672 A1 | 6/2016 |
| EP | 132648 A1 | 2/1985 |
| EP | 1630747 A2 | 3/2006 |
| EP | 1708144 A2 | 10/2006 |
| EP | 2663101 A2 | 11/2013 |
| WO | 2015158606 A1 | 10/2015 |

OTHER PUBLICATIONS

Georgios Karagiannis et al, "Vehlicular Networking: A Survey and Tutorial on Requirements, Architectures, Challenges, Standards and Solutions", IEEE Communication, Surveys & Tutorials, Forth Quarter 2011, pp. 584-616, vol. 13, No. 4, XP011387780,ISSN: 1553-877.

EU-US ITS Task Force, "Draft Standards Harmonization Working Group Harmonization Task Group 1&3" Version, Sep. 6, 2012, pp. 1-66, XP014086489.

European Opposition dated Mar. 19, 2020 for corresponding EP Application No. 1571817707.

Bernhard Oehry, et al. The Cardme Concept, Jun. 1, 2020, Issue 3.

German Search Report dated Aug. 4, 2020 for the counterpart German Patent Application No. 10 2014 018 672.5.

* cited by examiner

METHOD AND APPARATUS FOR PROCESSING VEHICLE-TO-X COMMUNICATIONS

TECHNICAL FIELD

The invention relates to a method for processing a vehicle-to-X message in a vehicle-to-X communications module, and to a vehicle-to-X communications module and a storage medium for implementing the method.

BACKGROUND

Vehicle-to-X communications is currently in a phase of development and standardization. This term is understood to mean in particular communication between vehicles (vehicle-to-vehicle communication) and communication between vehicles and infrastructure (vehicle-to-infrastructure communication).

Standardization processes are currently in progress in particular at European Telecommunications Standards Institute (ETSI), at the Institute of Electrical and Electronics Engineers (IEEE) and at the Society of Automotive Engineers (SAE). Architectures of vehicle-to-X communications systems have been defined in standards ETSI TC ITS and in IEEE 1609 and laid down in corresponding standards documents. Until now, all the architectures have been designed solely either for the European market or for the American market.

There are no plans to unify both versions. Nevertheless, the systems have been harmonized in the respect that the functionality of the IEEE Wave system and the ETSI ITS are similar and that also similar data is transferred or provided for applications. Some of the applications based on Wave or ITS are the same, as is the case, for example, for GLOSA (Green Light Optimal Speed Advisory) or EVW (Emergency Vehicle Warning), although some are actually distinctly different. For example, the "Blind Spot and Lane Change Warning" is not planned in Europe, whereas "Pre-Crash Airbag Support" is not planned in the USA.

In principle, different components can be developed for the respective markets. These can then be fitted in a vehicle during manufacture according to the market for which the vehicle is destined. Apart from the high development costs, the disadvantage with this procedure, however, is the consequence that a vehicle would then be restricted to use in a specific geographical region, and only by costly replacement of components could be operated in a region having different requirements of the vehicle-to-X communications system. This would make it far harder to introduce vehicles into markets for which they were not originally built. This type of introduction is performed by independent importers (grey imports), and is also common for military or diplomatic vehicles.

Thus in order to design a vehicle to be compatible with different regions, solutions are known from the prior art in which there is an entire message-processing stack for each region, and for each region only the stack required for that region is used. Such stacks, however, are often very complex and therefore need a large amount of memory space. Carrying both sets of applicable software therefore requires the use of components with a correspondingly large memory. This can rule out the use of low-cost microprocessors, because they cannot accommodate the software needed for at least two regions. If, for example, a stack has a size of 8 GB, then a microprocessor must have a memory of at least 16 GB if two stacks are meant to be provided.

Although the majority of vehicles are actually used only in the intended region, this known solution thus means that far more powerful and hence more expensive components must be used simply because of the memory requirement. The increased costs associated therewith can make the introduction of vehicle-to-X communications far harder in particular in small, low-cost vehicles. This would be a major disadvantage, because practical introduction of vehicle-to-X communications is only possible when a majority of the vehicles are equipped with appropriate technology as quickly as possible.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore an object of one embodiment of the invention to provide a method for processing a vehicle-to-X message, in which method the requirements placed on the components to be fitted are reduced. An embodiment also provides a vehicle-to-X communications module and a storage medium for implementing the method.

The invention relates to a method for processing a vehicle-to-X message in a plurality of stages in a vehicle-to-X communications module. According to one embodiment, stages in a first group of stages are configured to process the vehicle-to-X message according to a regional status of the vehicle-to-X communications module.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

A person skilled in the art will derive further features and advantages from the exemplary embodiments described below with reference to the enclosed drawings, in which.

DETAILED DESCRIPTION

Figure 1:
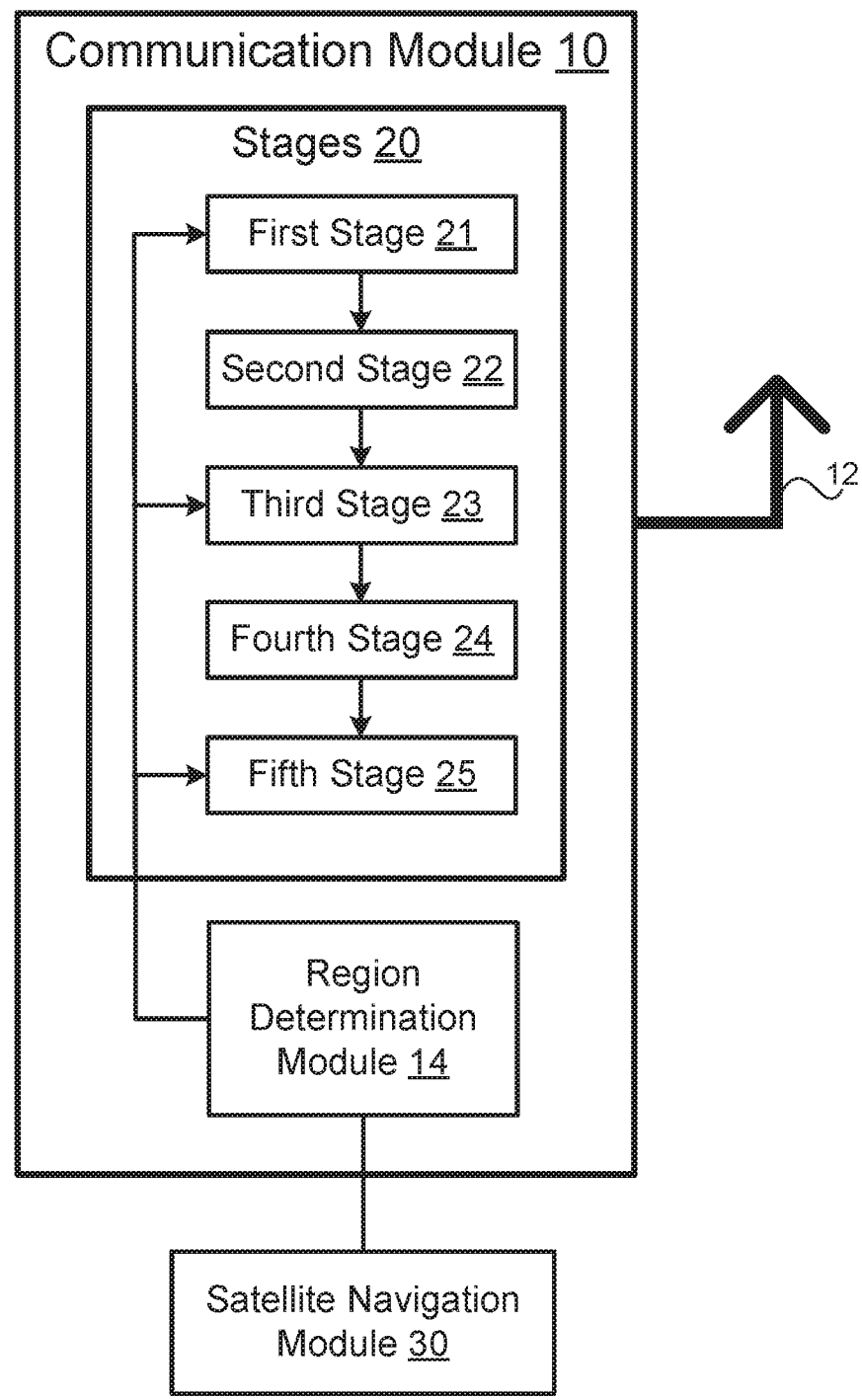
FIG. 1 shows a vehicle-to-X communications module.

FIG. 1 shows a schematic diagram of a vehicle-to-X communications module 10. It should be understood that this diagram shows only a few components, which are relevant to understanding the invention. The vehicle-to-X communications module 10 is connected to an antenna 12, which is used to communicate with other vehicles or also to communicate with infrastructure.

In the vehicle-to-X communications module 10 are implemented a number of stages 20 shown schematically, namely a first stage 21, a second stage 22, a third stage 23, a fourth stage 24 and a fifth stage 25. In addition, a region determination module 14 is arranged in the vehicle-to-X communications module 10 and is connected to a satellite navigation module 30 outside the vehicle-to-X communications module 10. The region determination module 14 receives via the satellite navigation module 30 data about the current location of a vehicle in which the vehicle-to-X communications module 10 is arranged. It determines, whenever the vehicle-to-X communications module 10 is switched on, in which region the vehicle is currently located, and on the basis thereof defines a corresponding regional status.

The regional status is notified to the first stage 21, the third stage 23 and the fifth stage 25. These three stages 21, 23, 25 belong to a first group of stages for which the form of the message processing depends on the region in which the vehicle-to-X communications module 10 is located. The two other stages, namely the second stage 22 and the fourth stage 24, on the other hand, belong to a second group of stages for which the message processing does not depend on the region. The two stages 22, 24 of the second group are implemented in discrete hardware modules, which have been developed in a single process for all eligible regions and can be used worldwide. The stages 21, 23, 25 of the first group, on the other hand, are implemented in software in order to ensure greater flexibility.

By virtue of the described embodiment, the vehicle-to-X communications module 10 can be used in different regions without the need to replace components, download new software or for the driver to intervene.

Figure 2:
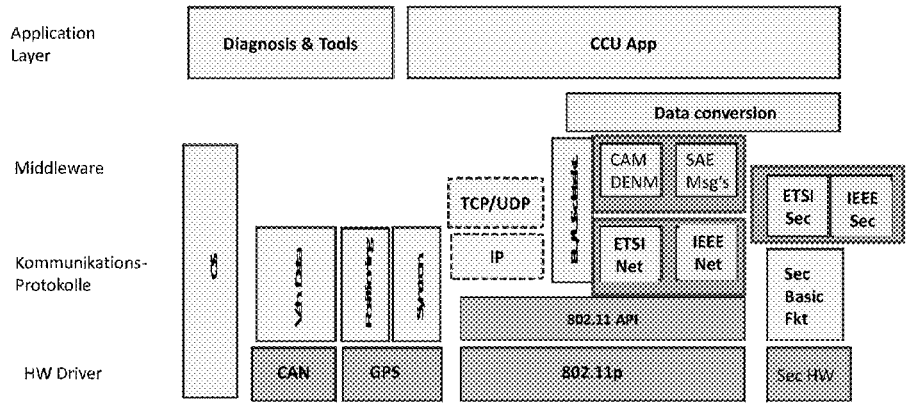
FIG. 2 shows an overview of vehicle-to-X controller software having integral dual stack.

FIG. 2 shows an overview of controller software for vehicle-to-X communications having integral dual stack.

Figure 3:
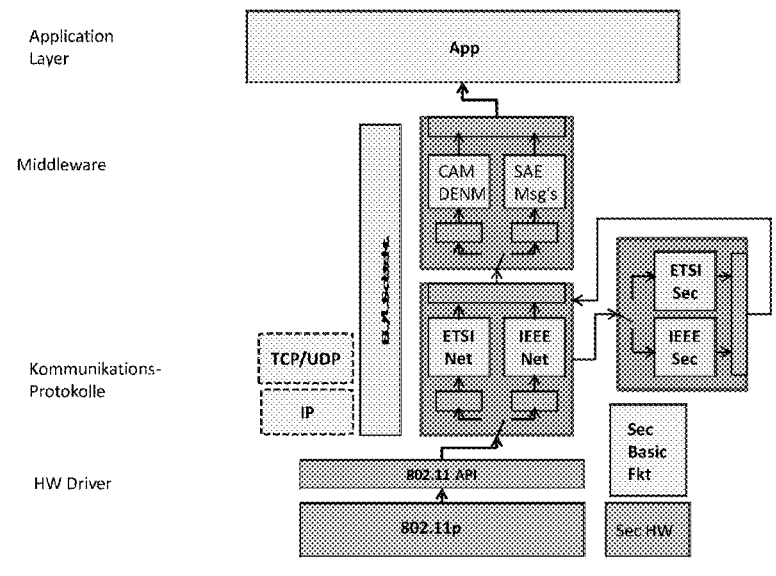
FIG. 3 shows details in the receive direction of the software of FIG. 2.

FIG. 3 shows a detailed view of a receive direction of the software of FIG. 2.

Reference is made to FIGS. 2 and 3 with regard to their functionality.

It should generally be pointed out that vehicle-to-X communications is understood to mean in particular direct communication between vehicles and/or between vehicles and infrastructure equipment. For instance, it can thus relate to vehicle-to-vehicle communications or vehicle-to-infrastructure communications. Where reference is made in this application to communication between vehicles, then basically this can take place on the basis of vehicle-to-vehicle communications, for example, which typically takes place without the intermediary of a mobile communications network or similar external infrastructure, and which therefore can be distinguished from other solutions based on a mobile communications network for instance. For example, vehicle-to-X communications can take place using the standards IEEE 802.11p or IEEE 1609.4. Vehicle-to-X communications can also be referred to as C2X or V2X communications. The subdomains can be referred to as C2C (Car-to-Car), V2V (Vehicle-to-Vehicle), C2I (Car-to-Infrastructure) or V2I (Vehicle-to-Infrastructure). The invention does not explicitly exclude, however, vehicle-to-X communications with the intermediary of a mobile communications network, for instance.

FIG. 2 shows an overview of controller software for vehicle-to-X communications having integral dual stack.

The figure shows four layers. At the top is shown an application layer. Underneath are middleware, communications protocols and finally the hardware drivers, referred to as HW drivers.

On the hardware side are shown interfaces to a CAN bus, to a GPS satellite communications module, to an 802.11p communications system and to security hardware (labeled as "SecHW"). Communication with other vehicle components is facilitated via the CAN bus; for instance vehicle data can be received. The location of the vehicle and a coordinated time, in particular a universal time (UTC), can be received via the GPS module. This can be used for synchronizing an internal clock, for instance. In particular this allows the correct time to be assigned to messages. Vehicle-to-X messages can be sent and received via the 802.11p communications system. Protocols such as TCP, UDP or IP, for example, can be used for this purpose. Access is made via an 802.11 API (Application Programming Interface). The security hardware allows various security functions, which are described further below. The security hardware can be accessed via security basic functions.

Dual-path processing is shown for the communications protocols and the middleware. The choice of path depends on a detection of whether the vehicle is located in the EU or in the USA regions. This detection is shown on the left-hand side of the paths.

The path used in the EU is labeled with "ETSI Net" and with "CAM DENM". The block "ETSI Sec" belongs to this path via the security hardware and provides security functions. The path used in the USA is labeled with "IEEE Net" and with "SAE Msg's". The block "IEEE Sec" belongs to this path via the security hardware and provides security functions.

The operation of the software shown is controlled and monitored across the levels of middleware, communications protocols and hardware by an operating system labeled as "OS".

A "CCU App" sits at the application level and provides various vehicle-to-X communications applications. In addition, there are also available further software modules for diagnostic purposes and other software tools, grouped under the term "Diagnostics & Tools".

FIG. 3 shows a detailed view of a receive direction of the software of FIG. 2. This figure shows in particular signal paths in greater detail.

A message arriving via the 802.11 API is fed to one of the two paths, as represented by a switch. Such switches are implemented in practice as virtual switches.

If the message is a message that is not subject to any special security requirements, it can be routed directly to one stage up, where again an assignment is made by a virtual switch. If, on the other hand, it is a message that is subject to special security requirements, it is routed initially to the block shown further to the right above the security hardware. Functions such as decryption of the message or an integrity check, for example, can be performed in this block. Once more, this can be done according to the geographical region, for which purpose a virtual switch is again provided. Then the message is routed again back into the path above the 802.11 API. After the processing steps from receiving to the middleware, the message is finally routed to an application labeled as "App".

In one embodiment the problems described in the introduction can be solved advantageously by dividing the respective stacks into individual stages. Each stage represents here a certain functionality, application or other part of processing the vehicle-to-X message. Those stages relating to functions that are meant to have a different design in different regions can be controlled according to the regional status. Other stages, which are meant to operate identically in all the regions, need not be duplicated, however. With reference to the problems described above, this means that there is no need for two entire stacks to be available to provide functionalities from two regions, but rather that those parts that are identical for both regions only need to be available once. This significantly reduces overall the amount of memory space required, with the result that lower-cost electronic components can be used. Likewise this significantly reduces the system price and hence also assists in the rapid market penetration of the system in particular in low-price vehicles.

The vehicle-to-X communications module can be implemented, for example, as a microcontroller, microprocessor, programmable logic controller (PLC), application-specific integrated circuit (ASIC) or as another user-programmable or even hardwired component. In particular, the vehicle-to-X communications module can comprise processor means and storage means, wherein stored in said storage means is a program code which, when executed, prompts the processor means to perform the method as described herein.

The first group of stages is a subset of the plurality of stages. A plurality is understood to mean here generally a number of two or more. The first group of stages is preferably a proper subset of the plurality of stages, which means in particular that there are yet other stages in the plurality of stages that do not belong to the first group of stages. Such stages, which do not belong to the first group of stages, can be in particular those stages that are meant to function identically in all the intended regions and hence only need to be present once.

It is preferably provided that stages in a second group of stages are configured to process the vehicle-to-X message irrespective of the regional status, wherein the first group of stages and the second group of stages do not intersect. Thus the second group of stages are those stages that can be implemented identically for all regions.

The first group of stages and the second group of stages preferably together constitute the majority of stages. This means that the majority of stages can be divided definitely into the first group of stages and the second group of stages. Stages other than those that either function according to the region (first group) or function irrespective of the region (second group) typically do not exist.

According to one embodiment, a number of stages in the second group of stages are implemented in separate hardware. This can further reduce the system costs, because functionalities that are identical for all eligible regions can be implemented by a one-off development effort in separate hardware, which can then be used in all relevant regions. Such an embodiment means that software no longer needs to be developed and maintained with regard to these functionalities. It should be understood that, for example, one such stage or also a plurality of such stages, according to one embodiment even all the stages, of the second group of stages can be implemented in such a way.

According to one embodiment, an ASN.1 encoder/decoder is part of the second group of stages. Such an encoder/decoder must typically be implemented such that its functionality does not depend on the region. It can therefore preferably be assigned to the second group of stages. It can be implemented in a separate hardware module, for example.

According to one embodiment, the stages in the first group of stages are implemented in software. This allows more flexible adaptation of the functionalities to be implemented according to region. Developing hardware components may not be viable specifically for stages in the first group, because of the lower volumes arising from the restriction to a specific region.

It should be understood that a certain stage can also be completely disabled according to the regional status. For instance, if a stage concerns a functionality that is not used in a certain region, then when the corresponding regional status exists, the corresponding stage can simply be disabled.

It should also be understood that there are numerous different functionalities in vehicle-to-X communications, and that the region-related variations are extremely wide-ranging for the functions that are implemented according to region. Therefore it is not possible to give a general definition for how stages respond specifically to a change in the regional status. It is easily possible, however, to specify in an implementation of a vehicle-to-X communications module whether the functionalities change according to a change in the regional status.

It should also be mentioned that the method can be used in particular both for a receive path and for a transmit path.

According to one embodiment, the method also comprises the following step of determining the regional status from a location of the vehicle-to-X communications module.

This step of determining the regional status is preferably performed in response to the vehicle-to-X communications module being switched on. This can take place, for example, immediately on starting up a vehicle, i.e. for instance on switching on the ignition of the vehicle. The regional status can be determined, for example, using a satellite navigation module, a mobile communications network, suitable surround sensors or by questioning the driver. Since the regional status typically does not change during a journey, this can normally be retained during the journey and need not be rechecked. If, however, the vehicle has been brought into another region between two journeys, for instance by shipping in an aircraft or on a cargo ship, then the new regional status is automatically detected and used accordingly.

According to one embodiment, a multi-hopping module and/or a channel-switching module are part of the first group of stages. These are typical modules, which are meant to have a functionality that depends on the region. The multi-hopping module is typically disabled in the USA, for example, because this functionality is not provided there. The channel-switching module, on the other hand, is typically disabled in Europe because there is no provision to use different channels in Europe.

One embodiment of the invention also relates to a vehicle-to-X communications module, which is configured to implement a method according to the invention. The vehicle-to-X communications module can be embodied as already described above. All the embodiments and variants described are applicable with regard to the method. Advantages described apply correspondingly.

Another embodiment of the invention also relates to a nonvolatile machine-readable storage medium containing a program code which, when executed, prompts a processor to perform a method according to the invention as described herein. All the embodiments and variants described are again applicable with regard to this method.

It should also be mentioned that embodiments, features and variants of the invention that are described in the various embodiments or exemplary embodiments and/or shown in the figures, can be combined with each other in any way. Single features or a plurality of features can be substituted for each other in any way. Feature combinations resulting therefrom shall be understood to be included in the disclosure of this application.

Features that are disclosed solely in the description, or features that are disclosed in the description or in a claim only in connection with other features, can fundamentally be essential in their own right. They can therefore also be included individually in claims for the purpose of delimiting from the prior art.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method for processing a vehicle-to-X message in a vehicle-to-X communications module configured to support at least two communication architectures each associated with a region, the method comprising:
   receiving, at a vehicle-to-X communications module supported by the vehicle, a vehicle-to-X message;
   receiving, at the vehicle-to-X communications module from a satellite navigation module in communication with the vehicle-to-X communication s module, a current vehicle location of the vehicle;
   determining, at the vehicle-to-X communications module, a regional status based on the current vehicle location, the regional status indicative of a region that includes the current vehicle location;
   processing, at the vehicle-to-X communications module, the vehicle-to-X message in a plurality of stages causing the vehicle to support at least two communication architectures each associated with a different region, the plurality of stages including:
      a first group of the plurality of stages processing the vehicle-to-X message based on the regional status of the vehicle-to-X communications module, the first group of the plurality of stages implemented in software of the vehicle-to-X communications module, and
      a second group of the plurality of stages processing the vehicle-to-X message irrespective of the regional status, the second group of the plurality of stages implemented in hardware of the vehicle-to-X communications module.

2. The method as claimed in claim 1, wherein the first group of the plurality of stages is a proper subset of the plurality of stages.

3. The method as claimed in claim 1, wherein the first group and the second group of the plurality of stages do not intersect.

4. The method as claimed in claim 3, wherein the first group of the plurality of stages and the second group of the plurality of stages together constitute the majority of the plurality of stages.

5. The method as claimed in claim 3, wherein at least two stages in the second group of the plurality of stages are implemented in separate hardware.

6. The method as claimed in claim 3, wherein an ASN.1 encoder/decoder is part of the second group of the plurality of stages.

7. The method as claimed in claim 1, wherein determining the regional status is performed in response to the vehicle-to-X communications module being switched on.

8. The method as claimed in claim 1, wherein at least one of a multi-hopping module and a channel-switching module are part of the first group of the plurality of stages.

9. A vehicle-to-X communications module supported by a vehicle and configured to support at least two communication architectures each associated with a region, the vehicle-to-X communications module implements instructions for processing a vehicle-to-X message, the instructions comprising:
   receiving a vehicle-to-X message;
   receiving a current vehicle location of the vehicle from a satellite navigation module;
   determining a regional status based on the current vehicle location, the regional status indicative of a region that includes the current vehicle location;
   processing the vehicle-to-X message in a plurality of stages, the plurality of stages causing the vehicle to support at least two communication architectures each associated with a different region, the plurality of stages including:
      a first group of the plurality of stages processing the vehicle-to-X message based on the regional status of the vehicle-to-X communications module, the first group of the plurality of stages implemented in software of the vehicle-to-X communications module, and
      a second group of the plurality of stages processing the vehicle-to-X message irrespective of the regional status, the second group of the plurality of stages implemented in hardware of the vehicle-to-X communication device.

10. The vehicle-to-X communications module of claim 9, wherein the first group of the plurality of stages is a proper subset of the plurality of stages.

11. The vehicle-to-X communications module of claim 9, wherein the first group and the second group of the plurality of stages do not intersect.

12. The vehicle-to-X communications module of claim 11, wherein the first group of the plurality of stages and the second group of the plurality of stages together constitute the majority of the plurality of stages.

13. The vehicle-to-X communications module of claim 11, wherein at least two stages in the second group of the plurality of stages are implemented in separate hardware.

14. The vehicle-to-X communications module of claim 11, wherein an ASN.1 encoder/decoder is part of the second group of the plurality of stages.

15. The vehicle-to-X communications module of claim 9, wherein the instruction for determining the regional status is performed in response to the vehicle-to-X communications module being switched on.

16. The vehicle-to-X communications module of claim 9, wherein at least one of a multi-hopping module and a channel-switching module are part of the first group of the plurality of stages.

17. A nonvolatile machine-readable storage medium containing a program code which, when executed, prompts a processor supported by a vehicle to:
   receive a vehicle-to-X message;
   receive a current vehicle location of the vehicle from a satellite navigation module;
   determine a regional status based on the current vehicle location, the regional status indicative of a region that includes the current vehicle location;
   process the vehicle-to-X message in a plurality of stages causing the vehicle to support at least two communication architectures each associated with a different region, the plurality of stages including:
- a first group of the plurality of stages configured to process the vehicle-to-X message according to a regional status of the vehicle, the first group of the plurality of stages implemented in software of the vehicle-to-X communication device, and
- a second group of the plurality of stages configured to process the vehicle-to-X message irrespective of the regional status, the second group of the plurality of stages implemented in hardware of the vehicle-to-X communication device.

18. The nonvolatile machine-readable storage medium of claim 17, wherein the first group of the plurality of stages is a proper subset of the plurality of stages.

19. The nonvolatile machine-readable storage medium of claim 17, wherein the first group and the second group of the plurality of stages do not intersect.

20. The nonvolatile machine-readable storage medium of claim 19, wherein the first group of the plurality of stages and the second group of the plurality of stages together constitute the majority of the plurality of stages.

21. The nonvolatile machine-readable storage medium of claim 19, wherein at least two stages in the second group of the plurality of stages are implemented in separate hardware.

22. The nonvolatile machine-readable storage medium of claim 19, wherein an ASN.1 encoder/decoder is part of the second group of the plurality of stages.

23. The nonvolatile machine-readable storage medium of claim 17, wherein the instruction for determining the regional status is performed in response to a vehicle-to-X communications module supported by the vehicle being switched on.

24. The nonvolatile machine-readable storage medium of claim 17, wherein at least one of a multi-hopping module and a channel-switching module are part of the first group of the plurality of stages.

\* \* \* \* \*